Nov. 24, 1936.  A. S. HUNTER  2,062,179
ARTICLES OF MANUFACTURE
Filed July 19, 1934   3 Sheets-Sheet 2
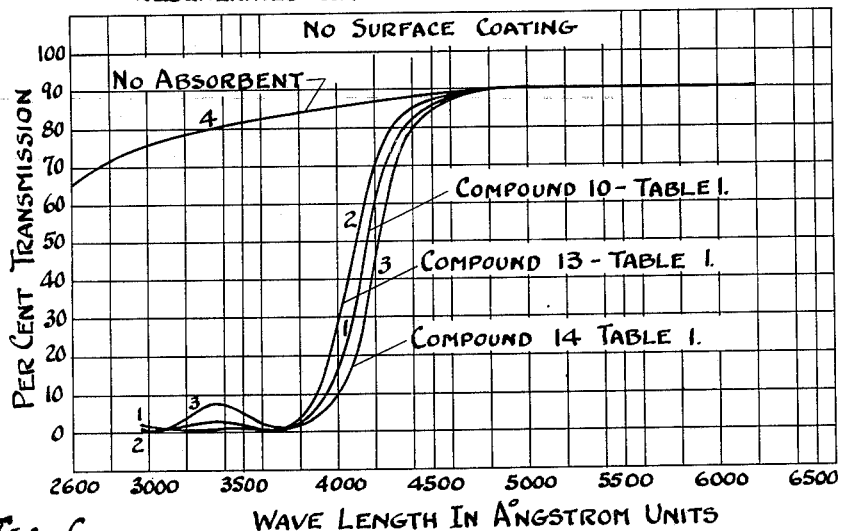
Fig. 6.
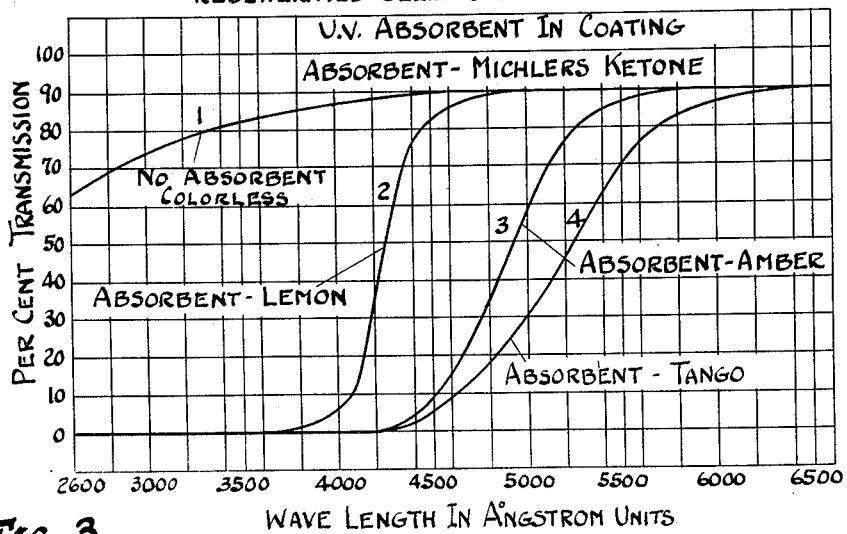
Fig. 3.  NOTE; LEMON COLOR IN 2 IS DUE ENTIRELY TO THE ABSORBENT IN THE COATING.
INVENTOR
A. Stuart Hunter
BY Charles F. Daley
ATTORNEY.

Patented Nov. 24, 1936

2,062,179

UNITED STATES PATENT OFFICE 2,062,179

ARTICLES OF MANUFACTURE

Archibald Stuart Hunter, Kenmore, N. Y., assignor, by mesne assignments, to E. I. du Pont de Nemours & Company, Wilmington, Del., a corporation of Delaware Application July 19, 1934, Serial No. 736,132

31 Claims. (Cl. 99—171)

This invention relates to materials which are capable of absorbing light rays particularly in the region of the ultra-violet and to their use in the fabrication of light filters, light protective wrappings, and the like. The invention relates particularly to a wrapping tissue of cellulosic material treated with a light absorbing agent and more particularly to a wrapping tissue having a regenerated cellulose base and capable of substantially preventing the rancidification of oils, fats, oil-bearing foods, or other undesirable changes in the composition of foodstuffs or similar products when such products are wrapped therein and subjected to light over the range of the solar spectrum.

It is well known that energy, radiated in the form of light rays, is capable of inducing and/or promoting certain chemical reactions and different photo-chemical reactions are induced by the action of light rays of characteristic wave length. Various substances, including certain synthetic chemical compounds, exhibit the power to absorb light rays of certain wave lengths or bands of wave lengths and if these can be uniformly and homogeneously distributed throughout a transparent supporting medium, as, for example, a gelatin sheet, the resultant sheet will act as a filter for all the light rays passing through and will transmit only those rays which are not absorbed by the supporting medium and/or the absorbing agent. Thus, it is possible to screen out undesirable light rays and this principle has long been applied in the photographic arts and in the preservation of certain commodities. So-called "light sensitive" commodities have been packed in colored glass containers in accordance with this principle.

Investigation has shown that vegetable and animal oils and fats, as well as oil-bearing foods including salad oils, mayonnaise, butter, lard, potato chips and the like, are susceptible to rancidity development when exposed to light. The rancidity seems to develop as the result of oxidation which, apart from any other causes, may be induced by the photochemical action of light of certain wave lengths. Obviously, if all light is excluded, development of rancidity by photochemical action cannot take place. In the packaging of commodities such as those enumerated, however, it is not always desirable to place them in opaque wrappers or containers.

The modern trend in packaging leans towards the use of transparent containers. In recent years, transparent wrapping tissues, such as those of regenerated cellulose, especially the moistureproofed varieties, have come to the fore, particularly because such wrapping tissues provide protection against contamination, serve to retain the original characteristics of the wrapped material such as moisture content, guard against the transmission of oils and greases when the material contains these substances, and at the same time offer sales appeal by permitting visual inspection by a prospective customer.

I have found that fat- or oil-bearing foodstuffs of the type mentioned are not appreciably affected, at least as regards rancidity development during their normal storage or shelf life as commodities, by light of any wave length within the bounds of the visible portion of the solar spectrum. On the contrary, the particularly harmful light rays are found in the region of the near ultra-violet and even these harmful rays seem to be more or less concentrated in certain wave length bands. I have found that marked photochemical action takes place in the above-mentioned substances when they are exposed to light within the band 2900–3100 A° and again, in the band 3500–3700 A°. The lower band is very close to the lower limit of the solar spectrum as it is observed in the terrestrial atmosphere. Furthermore, light of wave lengths below 3100 A° does not penetrate to any appreciable extent the glass commonly used for windows. On the contrary, the upper band, 3500–3700 A°, is very close to the lower limit of the visible solar spectrum and fairly large amounts of light in this wave length band are transmitted by window glass, glass bottles, etc.

Foodstuffs and commodities subject to rancidity development are rarely exposed to direct sunlight and since the light which normally falls upon them is artificial or bottle- or window glass-filtered sunlight, it is quite apparent from the above that the light which is most detrimental and produces the greatest effect as regards rancidity development appears to be in the region of the wave length band, 3500–3700 A°. In contrast to this, the need for the exclusion of light within the bounds of the visible solar spectrum (4000–7000 A°) is relatively less important for the protection of oil-bearing foodstuffs against rancidity development during their normal storage or shelf life as commodities.

I have found that I can produce a transparent, substantially colorless, thin, flexible wrapping tissue, moistureproof if desired, capable of protecting oil-bearing foodstuffs against appreciable rancidity development for a substantial period of time by incorporating in or on the wrapping tissue, or in a coating composition deposited on the surface or surfaces of the wrapping tissue, a substance which shows little or no tendency to absorb light of wave lengths in the visible spectrum, but shows a marked absorption in the ultra-violet with a maximum and substantially complete absorption within the region of 3200–4000 A° and preferably within the range 3500–3700 A°.

Wherever the term "substantially complete absorption" or a term of similar significance is used throughout the specification or claims, without further qualification, it signifies an absorption of 90% or more.

It is possible to use substances which show similar marked absorption in the ultra-violet region of the solar spectrum and also show some absorption in the visible region provided the latter absorption is fairly well distributed so that appreciable color is avoided and at least 50% of the available total visible light is transmitted. For certain purposes, it may be desirable or advantageous to additionally screen out a portion of the light in the visible region and this will obviously result in a more or less colored product. Such special effects will be discussed in greater detail hereinafter.

Generally speaking, the object of the invention is to provide a light filter capable of substantial absorption in the region of the near ultra-violet.

A further object is to provide a light filter having a substantially complete and preferably a maximum absorption of light within the wave length band of 3200–4000 A°.

A still further object comprises a light filter having a substantially complete and preferably a maximum absorption within the range 3500–3700 A°.

A more specific object is to provide a light filter which shows little or no preferential absorption in the visible region and transmits 50% or more of the total available visible light while at the same time it absorbs 90% or more of light within the wave length band of 3200–4000 A° and preferably within the range 3500–3700 A°.

A still more specific object is to provide a wrapping tissue which is transparent, flexible, thin, moisture-proof if desired, substantially colorless and substantially impermeable to ultra-violet light, especially in the region of the wave length band of 3200–4000 A° and preferably within the range 3500–3700 A°.

A specific object is to provide a substantially colorless wrapping tissue having a regenerated cellulose base and capable of inhibiting the development of rancidity, as induced by photo-chemical action, in materials wrapped therein, especially when such materials comprise animal or vegetable oils or fats, oil-bearing foods and/or such commodities exemplified by salad oils, mayonnaise, butter, lard, potato chips or the like.

Other objects of the invention will appear hereinafter.

The objects of the invention are accomplished by impregnating and/or coating a transparent base, generally of pellicular nature, with a composition comprising a substance capable of absorbing ultra-violet light with a maximum and substantially complete absoption within the region of the wave length band of 3200–4000 A° and preferably within the range 3500–3700 A°.

The accompanying figures, which show spectral transmission characteristics, will be helpful in an understanding of the principles of this invention.

In these figures the relation is shown between the per cent transmission (as ordinates) and the wave length (as abscissæ) of incident light. It is to be understood that the values given are approximate and are dependent to some extent on the apparatus employed for their measurement, but they will serve to illustrate the relationships in a qualitative and practically quantitative way.

Fig. 3 illustrates the spectral transmission characteristics of pellicles of regenerated cellulose prepared by the viscose process, which are coated with a nitrocellulose lacquer composition. The film of curve I contains no added light absorbent. The film of curve II contains Michler's ketone which is responsible for the lemon color of the film. The films of curves III and IV contain Michler's ketone in substantially the same concentration per unit of surface as the film of curve II and, in addition, are colored respectively amber and tango.

Figure 4:
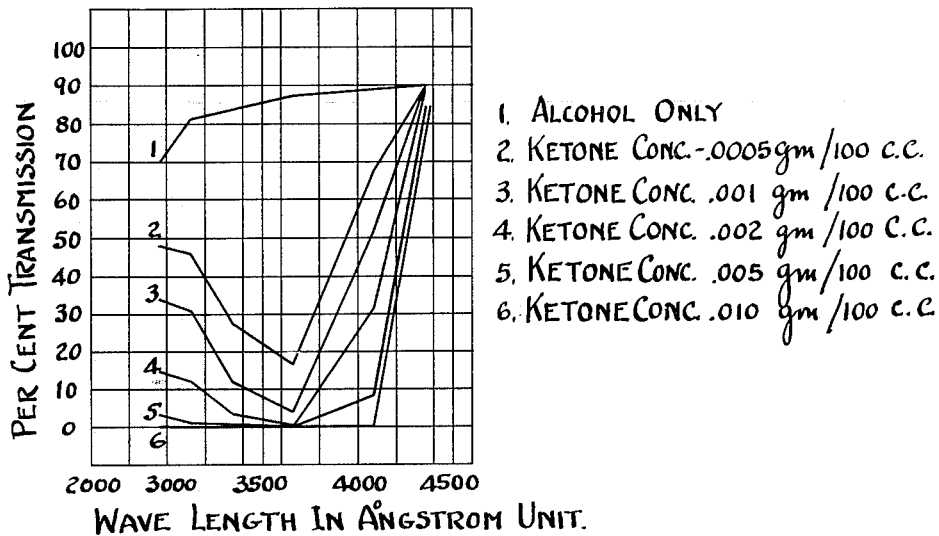
Figure 5:
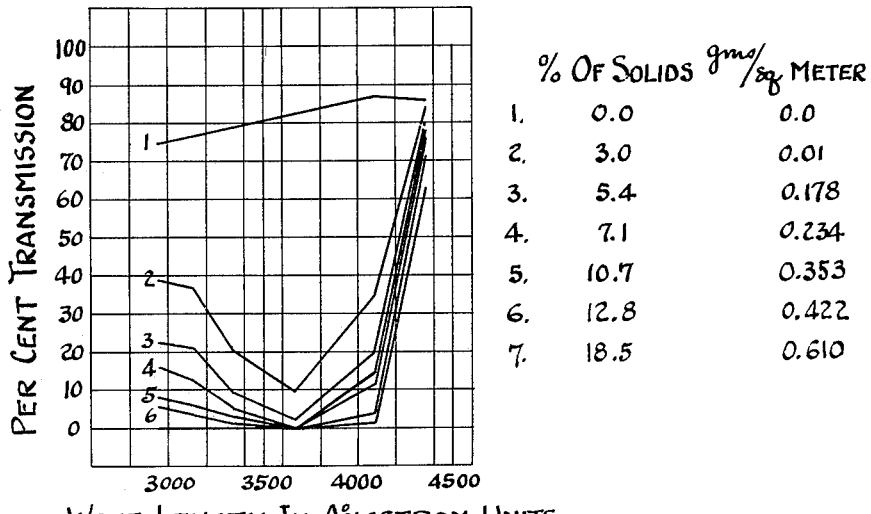

Figs. 4 and 5 shows the effect of concentration on the absorptive capacity of solutions (Fig. 4) and of nitrocellulose coatings (Fig. 5) containing Michler's ketone (4,4' bis(dimethylamino) benzophenone). Curve I of Fig. 4 refers to ethyl alcohol alone. Curves II to VI of Fig. 4 refer to alcohol solutions containing Michler's ketone in the concentrations noted. As to Fig. 5, each of the curves represented therein refer to similar nitrocellulose coatings modified by the inclusion of Michler's ketone in the concentrations noted on the drawings.

Fig. 6 illustrates the spectral transmission characteristics of pellicles of regenerated cellulose prepared by the viscose process impregnated with absorbents for ultra-violet light in accordance with one of the modifications of the invention.

The invention is primarily concerned with the use of a regenerated cellulose pellicle as the base material to be impregnated and/or coated with the light absorbent and for convenience, the invention and its applications will be described in terms of this base. The regenerated cellulose pellicle is preferably obtained by the viscose process, but it may also be obtained from a cuprammonium cellulose solution. It is to be understood, however, that other base materials may be used including cellulosic sheets or films such as may be obtained by coagulation or precipitation from aqueous cellulosic dispersions, as for example glycol cellulose, cellulose glycollic acid or other lowly etherified, cellulose glycollic acid derivatives where there is only one substituent group for several glucose units of the cellulose; cellulose esters such as cellulose nitrate, cellulose acetate or mixed esters of cellulose; cellulose ethers including ethyl cellulose, methyl cellulose, benzyl cellulose, mixed ethers or mixed etheresters of cellulose; gelatin, rubber or rubber compounds, casein or certain resinous materials capable of forming self-sustaining films or sheets. Where a semi-transparent or translucent product is satisfactory, glassine paper may be advantageously employed and where the only need is for a sheet material which will be impervious to the ultra-violet without regard to transmission of visible light, it is possible that paper, such as thin tissue paper or, indeed, heavier paper may be employed. In its preferred form the invention contemplates the use of a thin, transparent, flexible, non-fibrous and substantially non-porous sheet material such as a regenerated cellulose pellicle.

Depending on the nature of the base and the desired properties of the product, the absorbent may be impregnated into the body of the base or coated onto the surface of the base, or both. Insofar as regenerated cellulose pellicles are concerned, if the absorbent is water soluble, it may be impregnated into the cellulosic structure or adsorbed on the surface of the cellulosic structure while if it is soluble only in organic solvents, it may be incorporated in a coating composition, for example, one having a varnish or lacquer base, the regenerated cellulose pellicle then being coated with the said coating composition.

For general application, that form of the invention which contemplates the incorporation of the light absorbent into a coating composition may be considered as most useful since it may be applied to a great variety of bases. For the practice of this form of the invention, I have found that I may use any type of coating composition as a vehicle for the light absorbent, provided, of course, that the ingredients of the coating composition (including solvents) are compatible with and/or dissolve a sufficient amount of the light absorbent. It is understood that the vehicle will not be chosen so as to interfere with the transparency of the base pellicle as regards the transmission of visible light except in rare instances where opacity may be desired for some special reasons. Generally speaking, a clear nitrocellulose type lacquer will be satisfactory, but other cellulose derivative lacquers may be employed such as those comprising cellulose acetate, ethyl cellulose, benzyl cellulose or mixed ethers, esters or ether-esters of cellulose. In the same way, a clear varnish of the natural or synthetic resin type may be used. If a moistureproofing coating composition is desired, coating compositions such as those set forth in Charch and Prindle U. S. Patent No. 1,737,187 and Charch and Prindle U. S. Patent No. 1,826,696 will serve admirably.

For the purposes of this specification and claims, I define moistureproof materials as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98%, and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purpose of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. plus or minus 0.5° C. (preferably 39.5° C. plus or minus 0.25° C.), with a water vapor pressure differential of 50–55 mm. (preferably 53.4 plus or minus 0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

I have found that those substances capable of showing a maximum and substantially complete absorption within the wave length band of 3200–4000 A° when dissolved in low concentration in water, alcohol or benzene, will function equally well as regards light absorption when they, the substances, are incorporated into vehicles of the types referred to above. Such substances will exhibit substantially complete absorption in the 3500–3700 A° band, and the maximum absorption will preferably be within this latter band. Consequently, the utility of those substances for the practice of the present invention can be predicted from their behavior in such simple solutions. This relation may be seen by a comparison of Figs. 4 and 5 of the drawings. It is obvious, of course, that any absorption characteristics possessed by the vehicle will be additive and will consequently influence the total absorption of the coating composition when it comprises also the light absorbent.

I have found that the desired ultra-violet light absorptive capacity is possessed to a marked degree by cyclic, especially polycyclic and/or polynuclear, organic compounds, particularly those containing nitrogen which is unsaturated, or, if saturated, is directly linked to non-oxygen containing groups. Many such compounds also possess the capacity to additionally absorb certain amounts of light in various wave length bands in the visible spectrum and consequently, if used in accordance with the principles of this invention, a colored product will result. In the preferred form of the invention this is undesirable, but for certain purposes it may be advantageous or at least not detrimental.

*Ultra-violet absorbents of the type described which show little or no tendency towards selective absorption in the visible spectrum.*

In the preferred form of the invention, the product, i. e., light filter, wrapping tissue, film or the like, is transparent and substantially colorless while at the same time, it is substantially impervious to ultra-violet light and shows a maximum and substantially complete impermeability to light within the wave length band of 3200–4000 A°. By "transparent" is meant the transmission of 50% or more of the total available visible light and "colorless" indicates the absence of appreciable selective absorption in the range of the visible spectrum (4000–7000 A°).

Absorbents of this type which may be employed include N-alkylated derivatives of diaminobenzophenone and its homologues, which may be generally described by the structural formula:

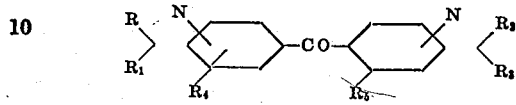

where R–R₅ inclusive may be the same or different alkyl, aryl or aralkyl groups and, furthermore, where R₄ and R₅ may be one or more similar or dissimilar substituents of any type desired including hydrogen. The amino groups will preferably be para- to the ketone group. Of these compounds, 4,4′ bis(dimethyl-amino) benzophenone (Michler's ketone), 4,4′-bis(diethyl-amino) benzophenone, and similar N-alkylated derivatives of toluidophenone (i. e. where R₄ and R₅ represent one methyl (CH₃—) substituent group respectively) may be mentioned.

Another general type of absorbent which is of similar character and may be used to advantage in the practice of this species of the invention includes phenyl hydrazine derivatives of aliphatic acids containing a carbonyl group in the chain, for example, aliphatic keto acids including their salts and esters, and especially the alpha keto acid derivatives. These may be generally described by the structural formula:

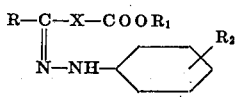

where X may be (CH₂)ₙ or any cyclic or condensed nucleus such as a phenyl or naphthyl residue or the like. Straight or branched chain aliphatic residues may be used and the value $n$ may be any desired number including zero. In alpha-keto acids, of course, $n$ will be zero. Homologues and analogues of the nuclear residues may also be included. The substitutent R may be hydrogen, but it is preferably alkyl, aryl, aralkyl, or acyl such as C₂H₅—, C₆H₅—, C₆H₅CH₂—, CH₃CO—, or the like; while R₁ may be an alkyl, aryl or aralkyl radical which is the same as or different from R or may be hydrogen or a metal, particularly an alkali metal such as sodium or potassium. R₂ may be one or more similar or dissimilar substituents which may be of any desired type including alkyl, aryl, aralkyl, oxyalkyl, or the like, acyl, hydroxyl, nitro, nitroso, amino or hydrogen. As typical substances in this group, the sodium salt of the alpha phenyl hydrazone of alpha-beta-diketo butyric acid

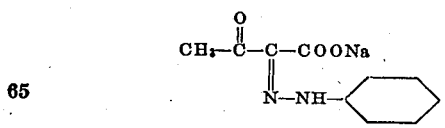

the ethyl ester of the alpha phenylhydrazone of alpha-beta-diketobutyric acid

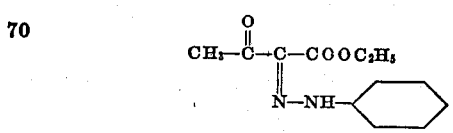

and the ethyl ester of the alpha p-hydroxy-phenyl hydrazone of alpha-beta-diketobutyric acid

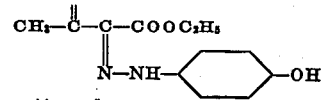

may be mentioned.

It is to be observed that substances of the type included in this category have the solubilizing group, which renders them capable of solution in water, in the keto-acid residue rather than in the phenyl hydrazine residue.

*Ultra-violet absorbents of the type described which show a slight ability for re-radiation as evidenced by fluorescence.*

Certain chemical compounds have the power to re-radiate at least a portion of the absorbed light waves when exposed to ultra-violet light. Usually, the radiated light is of higher wave length which may be within the range of the visible spectrum. The effect is to produce what is recognized as a colored fluorescence. Those substances which absorb most strongly in the lower ultra-violet wave bands may fluoresce only slightly, or in the violet region of the visible spectrum. Generally, such compounds will not be effective in the practice of the invention because while they may absorb well in the ultra-violet, they may not show a maximum and substantially complete absorption within the wave length band of 3200–4000 A°. Consequently, they are of insufficient potency to operate effectively in the relatively low concentrations acceptable in the preferred embodiment of this invention. On the other hand, those compounds which, when exposed to ultra-violet light, fluoresce blue, green or yellow, apparently do so because their maximum absorption in the near ultra-violet approaches more closely the lower limits of the visible spectrum. This latter means that their maximum absorption will be within the region of the wave length band of 3200–4000 A° and consequently, such compounds will be useful in the practice of this invention.

Included in this type of absorbing agent are many dye intermediates, especially the neutral solutions (e. g. aqueous solutions of the alkali metal salts) of the amino-sulfonic acids of naphthalene such as 2-naphthylamine, 6,8-disulfonic acid

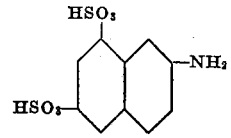

which fluoresces a violet-blue; 1-naphthylamine, 4,8-disulfonic acid

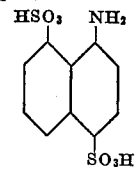

which exhibits blue fluorescence; and 1-naphthylamine, 2,4,8,-trisulfonic acid

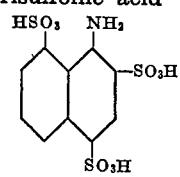

which fluoresces yellow, and the like.

The above mentioned specific compounds illustrate the relation between color of fluorescence and position of maximum absorption in the near ultra-violet. By reference to Table I (below) it can be seen that as the fluorescence progresses from violet-blue (compound No. 13) through blue (compound No. 10) to yellow (compound No. 11) the position of maximum absorption in the near ultra-violet approaches the lower limit of the visible spectrum (4000 A°).

Substances other than sulfonated dye intermediates also show this relation between color of fluorescence and absorptive capacity within the desired range, although generally they are less potent than the naphthylamine sulfonic acids, such as those mentioned above, and these latter are to be preferred. Illustrative samples which may be mentioned are isodinaphthalene oxide, B-hydroxy benzanthrone.

*Ultra-violet absorbents of the type desired which show appreciable selective absorption in the visible spectrum.*

As has been indicated above, there are certain purposes to which wrapping tissues or light filters of the type described may be applied, where selective absorption in the visible spectrum (i. e. resulting in a colored product) will not be detrimental and, indeed, it may be advantageous. Thus, there are compounds which are very satisfactory as ultra-violet absorbents of the type described, but which additionally absorb appreciable amounts of light in the lower portion of the visible spectrum. Thus, substances or combinations of substances which will exhibit a maximum and substantially complete absorption within wave length band of 3200–4000 A°, but which permit transmission of 50% or more of the total available visible light, even though some selective absorption of the lower wave lengths in the visible is present, may find application in accordance with this invention.

Single substances of this character may be represented generally by the structural formula:

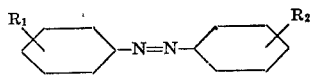

Where $R_1$ may be alkyl, aryl, aralkyl, oxyalkyl or the like, acyl, nitro, nitroso, amino or substituted amino, hydroxyl or hydrogen and may represent one or more of similar or dissimiliar groups of the types enumerated and where $R_2$ may be the same or different group or groups as compared to $R_1$ except that where $R_1$ is hydrogen only, then $R_2$ will be other than hydrogen.

As examples of useful materials, p-hydroxy-azo-benzene,

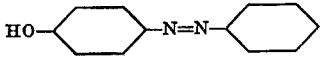

benzene azo-diphenylamine,

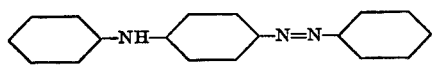

benzene azoresorcinol,

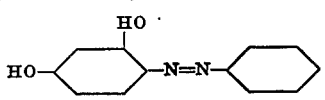

and benzene azo-cresol,

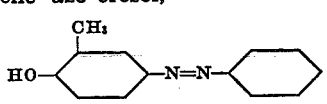

may be mentioned.

Most substances in this class are rather strongly colored (yellow) due to selective absorption in the lower range of the visible spectrum and are, therefore, of no use when a colorless product is desired, but their use may be advantageous where it is desired to screen out a portion of the visible light in addition to the ultra-violet. Various photographic filters of special or peculiar characteristics may thus be prepared.

Certain dyestuffs which do not fall in the class encompassed by the above general formula, have been found to operate with fair success in accordance with the invention, although obviously they absorb rather strongly in the visible region of the spectrum (4000–7000 A°). As illustrative of this class may be mentioned Thioflavine S (Color Index No. 816), Fast yellow CH (Color Index No. 365), Stilbene yellow G (Color Index No. 622), Fast yellow N. N. L. (Color Index No. 814), Fast orange E. G. L.

Certain of the vat dyes such as Ponsol Flavone G. C. (Color Index No. 1095) or Ponsol yellow G. (Color Index No. 1118) and certain sulfur dyes such as Sulfogene yellow C. F. or Sulfogene golden brown R. C. F. (Color Index No. 949) may also be used to advantage in producing an article in accordance with the invention.

The color index numbers of the above mentioned dyes are given in Rowe's "Color Index" of the Society of Dyers and Colorists, 1924, and/or the supplement thereto. Because of their color, these substances may be used to best advantage in the alternative forms of the invention as will be more specifically set forth hereinafter.

Representative and useful substances which may be used in the practice of this invention are contained in the following table:

*Table I*

| No. | Substance | Solvent | Absorption index | | | | |
|---|---|---|---|---|---|---|---|
| | | | 2536A° | 3132A° | 3663A° | 4078A° | 4359A° |
| 1 | 4, 4'-bis-(dimethylamino) benzophenone (Michler's ketone) | Alcohol | 0 | 0 | 0 | (1) | 3 |
| 2 | 4, 4'-bis-(diethylamino) benzophenone | ---do----- | 0 | (1) | 0 | 0 | 3 |
| 3 | p-Hydroxy-azobenzene | ---do----- | (1) | 0 | 0 | 1 | 3 |
| 4 | Benzene-azo diphenylamine | ---do----- | 0 | 1 | (1) | 0 | 0 |
| 5 | Benzene-azo resorcinol | ---do----- | 0 | 1 | 0 | 0 | (1) |
| 6 | Benzene-azo cresol | ---do----- | 0 | 0 | 0 | 1-2 | 2 |
| 7 | Sodium-(a-phenylhydrazone)-a, B diketobutyrate | Water | (1) | (1) | 0 | 2 | 3 |
| 8 | Ethyl-(a-phenylhydrazone)-a, B diketobutyrate | Alcohol | 0 | (1) | 0 | 1 | 3 |
| 9 | Ethyl-(a-p-hydroxy phenylhydrazone)-a, B diketobutyrate | ---do----- | 0 | 2 | 0 | 0 | 1 |
| 10 | 1-naphthylamine-4, 8-disulfonic acid | Water | 0 | 0 | 0 | 3 | 3 |
| 11 | 1-naphthylamine-2, 4, 8-trisulfonic acid | ---do----- | 0 | 1 | 0 | 3 | 3 |
| 12 | Thioflavine S | ---do----- | 1 | 1 | 0 | 1 | 2 |
| 13 | 2-naphthylamine-6, 8—disulfonic acid | ---do----- | 0 | 1 | 2 | 3 | 3 |
| 14 | 2-naphthylamine-3, 6, 8—trisulfonic acid | ---do----- | 0 | 1-2 | 2-3 | 3 | 3 |

All observations for the individual absorbents regarding their light absorption were made through a quartz cell, using a layer of solution 1 cm. thick. The solutions contained 0.004% of the absorbent dissolved in alcohol, or water. The cell containing the sample was in each case placed in a quartz-mercury spectrograph so that the light beam from the light source passed through the sample before entering the spectrograph. The following table gives formulae for coating compositions containing Michler's ketone as an ultra-violet light absorbent:

manner well known in the art. Columns 4–8 inclusive in the table represent estimated intensity for the several characteristic lines and the index numbers signify the following:

0 = complete absorption
(1) = better absorption than 0 but less than 1
1 = faintly visible line—strong absorption
1–2 = absorption between 1 and 2
2 = strongly visible line—noticeable absorption
3 = no apparent absorption Inspection of Table I shows that the compounds

*Table II*

| | Examples | | | | | |
|---|---|---|---|---|---|---|
| | 1 | 2 | 3 | 4 | 5 | 6 |
| Coating composition (wt. %) | | | | | | |
| Solids— | | | | | | |
| Pyroxylin (12.5% N) | 6.39 | 5.84 | | | | |
| Pyroxylin (11.5% N) | | 1.75 | 6.59 | | | 6.65 |
| Cellulose acetate | | | | | 7.51 | |
| Ethyl cellulose | | | | 6.68 | | |
| De-waxed dammar | 1.58 | 1.44 | 1.02 | 1.81 | | 0.97 |
| Hydrogenated rosin | | | | | 2.73 | |
| Dibutyl phthalate | 2.66 | 0.29 | 1.39 | 2.34 | | 1.39 |
| Dicyclohexyl phthalate | | 0.88 | 3.89 | | | 3.90 |
| "Santicizer" B-16* | | | | | 2.73 | |
| Paraffin wax | 0.44 | | 0.33 | | | 0.35 |
| Dyestuff △ | | | | 0.04 △ | 0.05 △ | |
| Michler's ketone | 0.66 | 4.38 | 1.80 | 1.48 | 1.71 | 1.80 |
| Solvents— | | | | | | |
| Ethyl acetate | 52.34 | 50.34 | 52.44 | 14.84 | 8.53 | 52.72 |
| Toluene | 26.92 | 28.39 | 27.37 | 49.16 | 17.05 | 25.45 |
| Ethyl alcohol | 8.90 | 6.57 | 5.17 | 23.65 | 8.53 | 6.77 |
| Acetone | 0.11 | 0.12 | | | 34.11 | |
| Methoxyethanol | | | | | 17.05 | |
| Solids composition (wt. %)— | | | | | | |
| Cellulose derivative | 54.47 | 52.05 | 43.94 | 54.05 | 50.98 | 44.13 |
| Resin | 13.46 | 9.88 | 6.68 | 14.66 | 18.54 | 6.46 |
| Plasticizer | 22.64 | 8.02 | 35.14 | 18.92 | 18.54 | 35.11 |
| Wax | 3.77 | | 2.22 | | | 2.30 |
| Dyestuff △ | | | | 0.36 △ | 0.35 △ | |
| Michler's ketone | 5.66 | 30.05 | 12.02 | 12.01 | 11.59 | 12.00 |
| Solids (% in coating comp.) | 11.73 | 14.58 | 15.02 | 12.35 | 14.73 | 15.06 |

\* Butyl phthalyl-butylglycollate.
△ "Celanthrene" brilliant blue—(double powder)

The following table illustrates the absorption characteristics of various materials described herein:

enumerated absorb strongly in the ultra-violet with a substantially complete absorption within the region of 3200–4000 A° and with a rather

*Table III*

Figure 1:
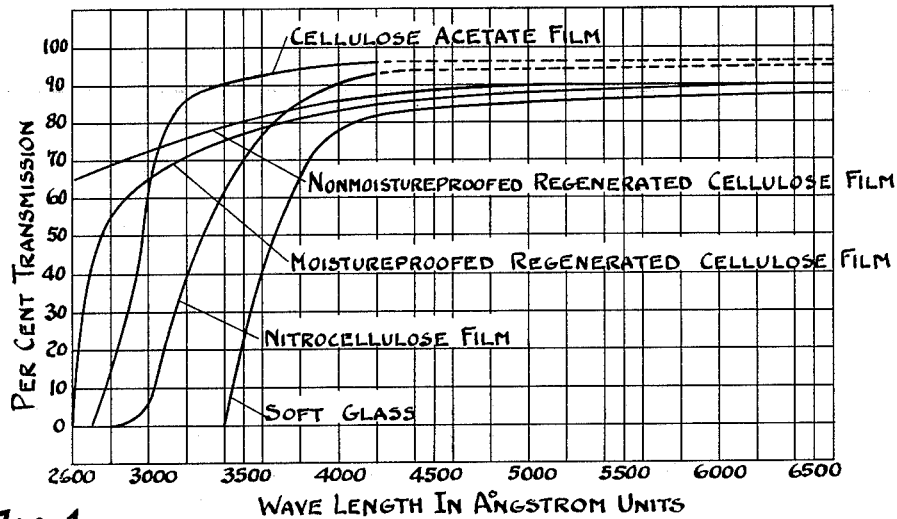
Fig. 1 illustrates the spectral transmission characteristics of several transparent materials capable of use in the packaging of commodities.
Figure 2:
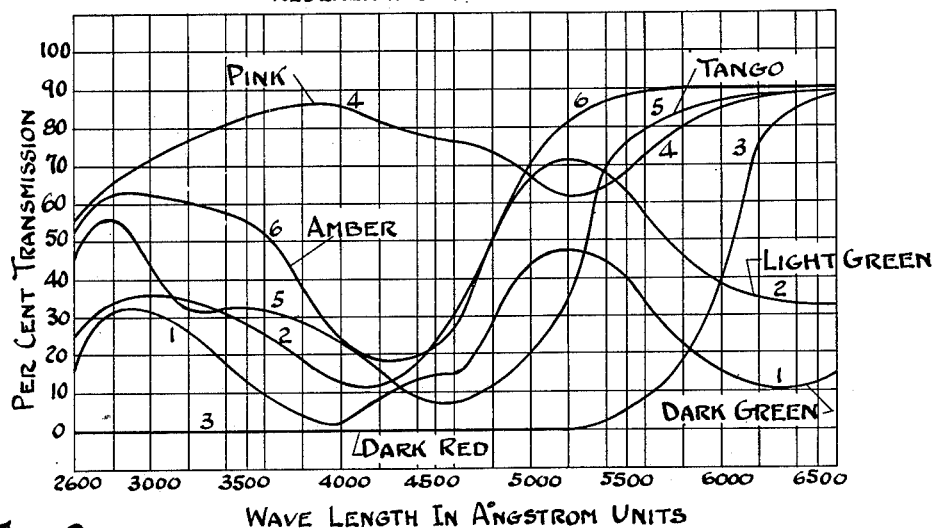
Fig. 2 illustrates the spectral transmission characteristics of various representative colored wrapping tissues of regenerated cellulose made by the viscose process. No special impregnations or surface coatings were provided, but the light absorption is due entirely to the absorption characteristics of the dye employed and its concentration as indicated by the color density.

| | Absorption index | | | | | Approx. coating thickness inches × 10⁻⁴ | Approx. amt. of absorbent gms/ sq. meter of surface | Protective factor potato chips |
|---|---|---|---|---|---|---|---|---|
| | 2536 A° | 3132 A° | 3663 A° | 4078 A° | 4359 A° | | | |
| Example 1.—Table II | 0 | 1 | (1) | 1–2 | 3 | 0.9 | 0.18 | 3.3 |
| Example 2.—Table II | 0 | 0 | 0 | 0 | 3 | 1.2 | 1.3 | 7.8 |
| Example 3.—Table II | 0 | 0 | 0 | 0 | 3 | 1.1 | 0.48 | 7.2 |
| Example 4.—Table II | (1) | 1–2 | 0 | 3 | 3 | 0.6 | 0.27 | 7.6 |
| Example 5.—Table II | 0 | 0 | 0 | 2 | 3 | 1.0 | 0.46 | 7.7 |
| Example 6.—Table II—Curve II, Figure 3 | 0 | 0 | 0 | 0 | 3 | 1.3 | 0.61 | 8.4 |
| Example 6.—Table II—Curve III, Figure 3 | 0 | 0 | 0 | 0 | 1–2 | 1.4 | 0.64 | 8.9 |
| Example 6.—Table II—Curve IV, Figure 3 | 0 | 0 | 0 | 0 | 0 | 1.3 | 0.61 | 9.5 |
| Plain regenerated cellulose (Curve V—Fig. 1) | 2 | 3 | 3 | 3 | (1) | | | 1.0 |
| Dark green commercial regenerated cellulose (Curve I—Fig. 2) | (1) | 1–2 | 1 | 0 | (1) | | | 4.6 |
| Example 7 | 0 | 1 | 0 | 3 | 3 | | | 7.2 |
| Example 8 | 0 | 0 | (1) | 3 | 3 | | | 7.2 |
| Example 9 | 0 | 0 | 0 | 0 | 3 | | | 8.0 |
| Example 10 | 0 | 0 | 0 | 2 | 3 | | | 7.5 |

The absorption indices for the examples of coating compositions illustrated in Tables I and III were obtained by using as a filter, substituted for the quartz cell, a sheet of regenerated cellulose coated on both sides in accordance with the invention and having the coating thickness and absorbent concentration as indicated in columns 9 and 10. The absorption was estimated visually by the intensity of the characteristic lines from the particular light source when projected from the spectograph onto a fluorescent screen in the sharp cut-off at the lower edge of the visible spectrum.

It is to be remembered that the concentration of the light absorbing per unit area plays a very important role in the present invention. Many substances might be considered as falling within the scope of the present invention by using a sufficiently large quantity either as a highly concentrated but thin layer, or as a thick but relatively less concentrated layer. When these light absorbents are to be used as components of a surface coating the latter is very thin, being of the order of a few ten-thousandths of an inch, and if the transparency, color and flexibility of the coated product are to be retained only a small amount of light absorbent is possible per unit area at any given coating thickness. It is necessary, therefore, that the absorbent be potent and exhibit the desired absorptive properties, when present in relatively small amounts. When dealing with the form of the invention which embodies the impregnation of the base material, it is apparent that a somewhat less potent agent can be used, for at a given concentration the relatively greater thickness of the base will provide more of the absorbent per unit area so that the ultimate result will be similar to that obtained by a thin layer of a more potent agent.

The above point is illustrated by reference to Fig. 5, from which it can be seen that with as little as 0.6 gms. of Michler's ketone distributed uniformly over 1 sq. meter of surface (both sides) of a sheet of regenerated cellulose by incorporation in a nitrocellulose lacquer, substantially complete absorption within the wave length band of 3200–4000 A° can be secured. With smaller amounts, even as low as about 0.2 gram per square meter, a nearly complete absorption is obtained with peak absorption within the band of 3200–4000 A°.

In one embodiment of the invention, that is, where a coating composition is provided, I have found that I may use any of the substances set forth which show satisfactory absorption characteristics in solution (see Table I) where the absorbent concentration is approximately 0.004%, by adjusting the concentration of the absorbent in the coating composition so that it constitutes 5–30% of the total film forming ingredients which may be referred to conveniently as the total solids. In certain instances lower concentrations may be employed. I prefer to employ about 10 to 20% of the absorbent based on the total solids content.

As illustrative of the several types of cellulose derivative vehicles that may be employed in the practice of this invention, several examples are given in Table II. It is to be understood that these examples are not intended to be limitative of the scope of the invention.

Referring, now, to Table II, it will be observed that Examples 1, 2, 3, and 6 illustrates the use of different types of nitrocellulose or mixtures of them while Example 4 and 5 show the use of other typical cellulose derivatives. Examples 1, 3 and 6 illustrate coating compositions which are additionally moistureproofing compositions. The use of Michler's ketone (4.4'-bis(dimethylamino)-benzophenone) in these examples is merely a choice of a typically good light absorbent of the type described and other substances such as those shown in Table I may be substituted in equivalent amounts if desired. In the preferred form of the invention, however, Michler's ketone may be used to advantage.

Coating compositions such as those described in Table II may be applied in any manner known to the coating arts to any of the base materials previously described. Preferably, the coatings should be thin, that is, a total coating thickness not to exceed 0.0005" and preferably of the order of 0.0001". When the coatings approximate the preferred thickness and the quantity of light absorbent in the coating solids is chosen within the preferred range as indicated above, the light absorbent will be present combined with the base in an amount varying from 0.15 to 1.5 grams per square meter of surface. Best results may be obtained when the absorbent is present in about 0.5–1.0 grams per square meter of surface.

When coatings of approximately 0.0001" total coating thickness are applied to both sides of a sheet of regenerated cellulose using the composition of Example 6 ,Table II), a clear, transparent, flexible moistureproof sheet material is obtained which is pale lemon in color and has the general spectral transmission characteristics shown by Curve II in Fig. 3. In this particular instance the absorbent will be present in about 0.6 gram per square meter of surface.

When the light absorbent material is water-soluble it is possible to employ another form of the invention wherein the base sheet is impregnated with the absorbent. Thus, for example, a sheet of regenerated cellulose may be dipped into an aqueous solution containing an absorbent such as those illustrated by Nos. 7, 10, 11, and 13 of Table I. The impregnating solution may contain, conveniently, about 1–5% of the absorbent. Since the regenerated cellulose sheet will customarily contain a softener such as glycerol, it is desirable to have the impregnating solution contain sufficient softener so that the final impregnated sheet will have the desired softener content (i. e. will not suffer loss of softener by extraction during its immersion in the impregnating bath). Alternatively, a sheet of gel regenerated cellulose, that is, one which has been regenerated, purified, bleached and washed but not subjected to a drying operation, may have its surface water removed as by squeeze rolls or the like, whereupon it may be treated directly with the impregnating bath. Since many of the absorbents may be susceptible to precipitation by alkali earth metals, it is advisable to use soft water in the impregnating bath although this is not necessary where no harm develops from the use of hard water. In some instances the absorbents may be made water soluble and/or neutral by the addition of small amounts of sodium hydroxide, ammonium hydroxide, trisodium phosphate, triethanolamine or the like. This does not seem to affect the absorbing power appreciably, but may tend to bring about a more rapid discoloration on aging and care should be exercised in using these materials.

Thus, the following examples illustrate this modification of the invention, wherein light absorbents are impregnated into the base sheets.

*Example 7.*—A sheet of plain regenerated cellulose commercially used as wrapping tissue, is dipped into a bath consisting of the following ingredients in approximately the proportions given:

| | |
|---|---|
| Compound #10, Table I | 3.0 grams |
| Glycerin | 5.0 grams |
| Triethanolamine | *q. s. to neutralize |
| Water | *q. s. to 100.0 grams |

*q. s.—Quantity sufficient.

The sheet is allowed to remain in the bath at room temperature for 5 minutes when it is removed, the excess bath squeezed off with suitable squeeze rolls or the like and the sheet allowed to dry at a temperature of 65–100° C., care being taken to maintain it free of wrinkles. The impregnated sheet will have spectral transmission characteristics approximately as shown by Curve I of Fig. 6. The sheet exhibits a slight blue fluorescence, especially in ultra-violet light, but is otherwise substantially colorless.

*Example 8.*—A sheet of gel regenerated cellulose is treated as in Example 7, substituting the following bath for impregnation:

| | |
|---|---|
| Compound #13, Table I | 3.0 grams |
| Ethylene glycol | 5.0 grams |
| Sodium hydroxide | *q. s. to neutralize |
| Water | *q. s. to 100.0 grams |

*q.s.—quantity sufficient.

This sheet will have the spectral transmission characteristics approximately as shown by Curve II of Fig. 6. Aside from a faint violet-blue fluorescence, the sheet is substantially colorless.

*Example 9.*—A sheet of plain regenerated cellulose, commercially used as wrapping tissue, treated as in Example 7, is provided with a surface coating such as is described in Example 6.

*Example 10.*—A sheet of gel regenerated cellulose is treated as in Example 7, substituting the following bath for impregnation:

| | Grams |
|---|---|
| Compound #7, Table I | 4.0 |
| Diethylene glycol | 5.0 |
| Water | 91.0 |

This sheet will be substantially colorless except for a pale yellow color which is not objectionable for many purposes especially in view of the absorption characteristics as shown by the indices in Table I. If desired, the sheet may be provided with a topcoat as in Example 9, using any coating composition such as those described in Table II.

It is obvious that, where color in the final product is desired or at least not objectionable, sheets of commercial colored regenerated cellulose may be substituted for the plain sheets in the above examples.

Certain of the substances described in the class of dye intermediates and the like, such as 1-naphthylamine, 4,8-disulfonic acid, show a tendency towards the development of color which is apparently due to slight oxidation either from photochemical action or other causes, but this tendency can be overcome by including in the impregnating bath, for example, a small amount of a reducing agent or oxidation inhibitor. Thus, sodium sulfite, sodium hydrosulfite, formaldehyde sulfoxalate, or any of the customary compounds of this sort, well known to the textile arts, can be used. Appropriate mixtures of these substances may be used to advantage in many instances. Usually the addition of 1-2% by weight of such compounds to the impregnating bath will effectively retard the color development. These reducing agents or oxidation inhibitors do not affect the light absorption characteristics aside from the general improvement which would be expected to follow improved stability and active life. In some instances, it is commercially impracticable to prepare certain of the absorbing substances of this type in a high degree of purity and sometimes the impurities are largely responsible for the color development. The above mentioned use of reducing agents serves to overcome this difficulty to a considerable extent.

Various combinations of the several methods of the invention may be advantageously employed. Thus, a light absorbent of the type described may be impregnated into the base sheet and then a coating containing another light absorbent may be superposed thereon. In this way the light absorbent in the coating may serve to protect the absorbent in the base and at the same time the combined protection of both will be afforded an article which may be wrapped, for example, in the coated sheet. In the same way a light absorbent which itself absorbs selectively in the range of the visible spectrum may be subject to deterioration by ultra-violet radiations so that if it is impregnated into a regenerated cellulose base, for example, a surface coating containing an ultra-violet absorbent of the type described will protect the first mentioned absorbent from destruction for a considerable length of time. At the same time substances susceptible to the development of rancidity as induced by photochemical action, wrapped in such a sheet material, will be preserved against such rancidity development by the combined actions of the two absorbents.

Certain foods or other light sensitive commodities may be affected by specific regions of the visible spectrum in addition to the ultra-violet. For example, their natural fresh color may fade. If a wrapping tissue prepared in accordance with the preferred form of this invention is used as a protective wrapper for these commodities, they will be preserved against rancidity development, but their appearance may change due to the effect of a portion of the visible light transmitted by the wrapper. This may be overcome, however, by providing the base sheet with a light absorbent capable of selectively absorbing the harmful visible rays and coating with a composition containing an ultra-violet light absorbent of the type described, or vice versa. This modification of the invention is illustrated in Curves III and IV of Fig. 3. It is apparent that such wrapping tissues or light filters will be colored, but they will transmit 50% or more of the total available visible light while at the same time, they absorb 90% or more of the ultra-violet which is primarily responsible for the development of rancidity.

The above modification of the invention may also be employed to advantage even though the absorption of the visible light may not be important from the standpoint of food preservation. Thus, roasted coffee beans, wrapped in a transparent, moistureproof and substantially colorless wrapper of the type described, will be preserved against rancidity development over the normal storage or shelf life as a commodity, but the appearance of the package will not be especially pleasing because of the dull brown color of the beans. A dark green wrapper is so dense and of such a color as to make the appearance of the package even more displeasing. If, however, a wrapper having the characteristics illustrated by Curve III of Fig. 3 is employed, the wrapper not only preserves the contents against rancidity development, but so enhances the appearance of the coffee beans that the package offers markedly improved sales appeal.

If desired, the coloring material which acts as an absorbent in the visible region of the spectrum may be added to the base sheet or it may be added to the coating composition. On the other hand, the color may be removed by judicious use of complementary colors. Thus, for example, the absorption of light from the visible region of the spectrum (thereby causing color) due to an absorbent in the base sheet may be balanced by including an absorbent for the remaining visible spectral wave bands, in the coating composition. This will result in a substantially colorless final sheet, but the per cent transmission of available light will be reduced. This last is not especially harmful if the final product transmits 50% or more of the available visible light particularly when selective absorption in the visible is thereby avoided. As a matter of fact, if the ultra-violet light absorbents of the type preferred by this invention tend to selectively absorb certain portions, for example, in the lower region of the visible spectrum, small amounts of the complementary color may be added to the coating composition for the removal of final color. Examples of such procedure are shown in Table II, Examples 4 and 5, where a small amount of "Celanthrene" brilliant blue was added to complement the pale lemon color caused by the slight selective blue absorption of Michler's ketone. The final sheet does not exhibit appreciable selective absorption in the visible range and transmits more than 50% of the total available visible light.

As illustrative of the transmission characteristics as regards visible light and ultra-violet light, irrespective of bands of selective absorption, comparison is drawn in Table IV between typical examples of the present invention and its modifications on the one hand and prior art wrappers on the other. These same and additional data can be seen by inspection of the curves in Figs. 1, 2, and 3.

Table IV

| Filter | Solar spectrum | |
|---|---|---|
| | Ultra-violet transmission 2900-4000 A°— percent | Visible transmission 4000-7000 A°—percent |
| Moistureproofed regenerated cellulose (commercial) | 85 | 90 |
| Dark green regenerated cellulose (commercial) | 10 | 21 |
| Regenerated cellulose coated with composition of Ex. 6, Table II | 0.6 | 83.5 |
| Commercial amber regenerated cellulose coated with composition of Ex. 6, Table II | 0.0 | 65.0 |
| Commercial tango regenerated cellulose coated with composition of Ex. 6, Table II | 0.0 | 56.6 |

It is apparent from Table IV that the prior art wrappings are either ineffective in screening out the ultra-violet or, if they do screen out the ultra-violet, they also absorb strongly in the visible.

As has been stated above, the development of rancidity is associated with an oxidation phenomenon which is made manifest by the appearance of peroxides in measurable quantities. A standard method for the determination of rancidity using the peroxide formation as an index is well known and needs no description here. The extent to which rancidity development may be retarded by the practice of this invention may be determined by the use of these methods.

For the purposes of this invention, however, a simpler test is used to enable rapid and easy classification of the products of the invention, especially the wrapping tissues, as regards their relative protective abilities. The test depends on the breakdown of an oil on the surface of a potato chip, which surface is known to have been exposed to light of definite characteristics. It also depends on the type reaction:

$$2KI + H_2O_2 \rightarrow 2KOH + I_2$$

Thus, a drop of a saturated aqueous solution of potassium iodide, placed on the surface of a freshly prepared potato chip (i. e. fried in non-rancid vegetable oil) produces no reaction and no color change is apparent. If rancidity development is induced, by photochemical action, for example, the catalytic action of the light increases the rate of oxygen absorption in the oil with a resultant peroxide formation. If then, the oil has begun to develop rancidity and a drop of the above mentioned potassium iodide solution is placed on the surface of the potato chip, free iodine will be liberated by reaction with the peroxides present and a spot will develop varying in color from light brown to a seemingly jet black, depending on the degree of peroxide formation which has taken place. In other words, the color intensity is a measure of the degree of rancidity development.

This spot test may be applied as an accelerated test to determine the relative protective capacity of a light filter such as is set forth in this invention. A constant light source should be used which provides a type of energy as near as possible to natural sunlight since it is obvious that the rate of oil degradation will be dependent on the ultra-violet content of the light supply. Commercially available "sunlamps" such as the "S—1 Sun Lamp", manufactured by the General Electric Co. and operating with a light intensity of 500 foot candles, will serve admirably.

In making the test, freshly prepared potato chips are exposed to the light, the light filter (wrapping tissue, etc.) under test being interposed between the potato chips and the light source so that all light falling on the potato chips must pass through the filter. The time required for the development of sufficient rancidity to produce the first indication of color using the spot test described above and allowing 5 minutes for color appearance is measured and compared with the time required to produce the same degree of rancidity (as indicated by the color intensity of the spot test) when a sheet of plain regenerated cellulose is used as the filter. The ratio of the time required for the filter being tested to the time required for the plain regenerated cellulose filter may be termed the protective factor and represents the relative ability of the filter to retard the development of rancidity. Since this protective factor is relative, it is, of course, independent of the actual rate of rancidity development which may vary with the particular samples of potato chips being used, or the oil employed in their preparation.

Obviously, if some other substance or commodity such as lard, butter, mayonnaise or the like, which substances are sensitive to the development of rancidity, especially as it is induced by photochemical action, be used in an accelerated test, the protective factors may be different from those obtained using potato chips, but they will still represent the relative protective abilities of the filters employed.

Table III sets forth illustrative values of protective factors obtained through the use of the above described test. It is to be noted that dark green regenerated cellulose sheeting shows a protective factor of 4.6 as compared to the protective factor of 8.4 for the substantially colorless sheet of Curve II, Fig. 3. Additionally, this last sheet is moistureproof and therefore offers the combined advantages of a flexible transparent, moistureproof, substantially colorless, light filter, wrapping tissue or the like, capable of protecting oil-bearing foodstuffs against appreciable rancidity development as induced by photochemical action for substantial periods of time.

The importance of absorbent concentration and the relatively greater potency of the ultra-violet light absorbents of this invention are illustrated in the following table which compares Michler's ketone and other ultra-violet light absorbents. The absorbents were incorporated into coating compositions such as that of Example I, Table II and commercial plain regenerated cellulose sheets coated with the compositions in accordance with the invention.

*Table V*

| Absorbent | Approximate amount of absorbent gms/sq. m. of surface | Protective factor (potato chip) |
| --- | --- | --- |
| Anthracene | 0.17 | 1.0 |
| Aesculin | 0.20 | 1.7 |
| Michler's ketone | 0.18 | 3.3 |

It is apparent that in equivalent low concentrations the Michler's ketone is markedly superior and this potency in low concentrations is important to the invention, as has been pointed out hereinbefore.

It is apparent that a wrapping tissue, for example, destined for use in the wrapping of foodstuffs must be prepared with due regard to toxicity, taste, odor, stability and other characteristics of similar nature. Many of the substances proposed as ultra-violet light absorbents according to the prior art have required the use of such high concentrations to produce satisfactory absorption that one or more of the above mentioned objectionable characteristics looms so large as to make their use impracticable, if not impossible, insofar as the instant invention is concerned. The light absorbents set forth above are of such nature as to be substantially non-toxic, odorless and tasteless especially in the low concentrations in which they are employed.

The invention offers numerous advantages over the prior art. New light filters are made available capable of screening out virtually all of the ultra-violet light, but transmitting a large amount of the available visible light. Wrapping tissues are provided capable of preserving oil-bearing commodities against rancidity development as induced by photochemical action of ultra-violet light while still retaining transparency as regards visible light, sufficient to render the commodities wrapped therein easily and attractively visible to a consumer. The preservative action against rancidity development may be combined with the other desirable properties of the wrapping tissue such as flexibility, thinness, moisture-proofness, color or even opacity to visible light. Many other advantages may be seen from the above discussion of the invention.

While the invention has been described primarily in terms of protection against rancidity development, it is to be understood that the invention is applicable in many of its embodiments for the protection of various commodities, other than oil-bearing commodities, where deterioration in odor, color, taste and the like, is induced or accelerated by ultra-violet light in the region of the wave length band described. Thus, for example, fading of the color of mustard, paprika, etc.; alteration of color, odor and taste in beverages including beers, wines, fruit juices, etc.; fading of shoes, gloves, fabrics, or other merchandise on display in show-windows; and numerous other instances where photochemical action of the type described is detrimental, may all be inhibited and perhaps prevented for the normal storage or shelf life of the commodity. Because of their unique characteristics, the light filters of the invention will find profitable use in the development and cultivation of certain types of plants. Many other uses will be apparent from the above description of the properties of the new products.

Wherever relative parts or proportions are referred to in the specification or claims, these will refer to parts or portions by weight unless otherwise indicated.

The terms "solar light", "solar visible light", and the like, as they occur in the claims, are used as a measure of the properties of the light absorbent filters. These terms, as they occur in the claims, are not intended to limit the light filters to use only with solar light, but apply to their use in connection with light whether natural or artificial.

It will be understood that commercial wrapping tissues of regenerated cellulose and the like will ordinarily have a thickness of 0.0008 to 0.002 inch. The thickness of the film is not at all critical, and commercial wrapping tissues or light filters of a different thickness than that specifically mentioned may be used if desired.

Inasmuch as the description and examples are largely illustrative in character, any variation or modification thereof which conforms to the spirit of the invention is intended to be included within the scope of the claims.

I claim:

1. A film suitable for use as a wrapping tissue having a material associated therewith which is an absorbent for light rays within the range 3200–4000 A°, said film transmitting at least 50% of available visible solar light and absorbing at least 90% of light within the range 3500–3700 A°.

2. A film suitable for use as a wrapping tissue having a material associated therewith which is an absorbent for light rays within the range 3200–4000 A°, said film transmitting at least 50% of available visible solar light and absorbing at least 90% of light within the range 3500–3700 A°, said material being present in a concentration of 0.15 to 1.5 grams per square meter of surface.

3. A film suitable for use as a wrapping tissue having a material associated therewith which is an absorbent for light rays within the range 3200–4000 A°, said film transmitting at least 50% of available visible solar light and absorbing at least 90% of light within the range 3500–3700 A°, said material being present in a concentration of 0.5 to 1.0 gram per square meter of surface.

4. A film suitable for use as a wrapping tissue having a material associated therewith which is an absorbent for light rays within the range 3200–4000 A°, said film transmitting at least 50% of available visible solar light and absorbing at least 90% of light within the range 3500–3700 A° and having no appreciable selective absorption of visible light.

5. A wrapping tissue comprising a transparent base and a surface coating and embodying a material which is an absorbent for light rays within the range 3200–4000 A°, said tissue absorbing at least 90% of light within the range 3500–3700 A°, and transmitting at least 50% of the visible solar light.

6. A wrapping tissue comprising a transparent cellulosic base and a surface coating and embodying a material which is an absorbent for light rays within the range 3200–4000 A°, said tissue absorbing at least 90% of light within the range 3500–3700 A°, and transmitting at least 50% of the visible solar light.

7. A wrapping tissue comprising a transparent regenerated cellulose base and a surface coating and embodying a material which is an absorbent for light rays within the range 3200–4000 A°, said tissue absorbing at least 90% of light within the range 3500–3700 A°, and transmitting at least 50% of the visible solar light.

8. A wrapping tissue comprising a transparent base and a surface coating and embodying a material which is an absorbent for light rays within the range 3200–4000 A°, said tissue absorbing at least 90% of light within the range 3500–3700 A°, and transmitting at least 50% of the visible solar light, said surface coating exhibiting no substantial visible light absorption characteristics.

9. The wrapping tissue defined in claim 5 characterized in that it exhibits no selective absorption of visible light.

10. A wrapping tissue comprising a transparent base and a surface coating and embodying a material which is an absorbent for light rays within the range 3200–4000 A°, said tissue absorbing at least 90% of light within the range 3500–3700 A°, and transmitting at least 50% of the visible solar light, said light absorbent material being incorporated in said base.

11. A wrapping tissue comprising a transparent base and a surface coating and embodying a material which is an absorbent for light rays within the range 3200–4000 A°, said tissue absorbing at least 90% of light within the range 3500–3700 A°, and transmitting at least 50% of the visible solar light, said light absorbent material being dissolved in the surface coating prior to the application of said coating to said base.

12. A transparent wrapping tissue containing an amino benzophenone, said tissue transmitting at least 50% of available visible solar light and absorbing at least 90% of light within the range 3500–3700 A°.

13. A transparent wrapping tissue containing a diamino benzophenone, said tissue transmitting at least 50% of available visible solar light and absorbing at least 90% of light within the range 3500–3700 A°.

14. A transparent wrapping tissue containing an alkyl amino benzophenone, said tissue transmitting at least 50% of available visible solar light and absorbing at least 90% of light within the range 3500–3700 A°.

15. A transparent wrapping tissue containing Michler's ketone, said tissue transmitting at least 50% of available visible solar light and absorbing at least 90% of light within the range 3500–3700 A°.

16. A transparent wrapping tissue comprising a base and Michler's ketone associated therewith, said tissue transmitting at least 50% of available visible solar light and absorbing at least 90% of light within the range 3500–3700 A°.

17. A transparent, flexible wrapping tissue comprising a cellulosic base and Michler's ketone associated therewith, said tissue transmitting at least 50% of available visible solar light and absorbing at least 90% of light within the range 3500–3700 A°.

18. A transparent, flexible wrapping tissue comprising a substantially non-fibrous transparent cellulosic base, and Michler's ketone associated therewith in a concentration of 0.15 to 1.5 grams per square meter of surface, said tissue transmitting at least 50% of available visible solar light and absorbing at least 90% of light within the range 3500–3700 A°.

19. A transparent, flexible wrapping tissue comprising a substantially non-fibrous transparent cellulosic base, and Michler's ketone associated therewith in a concentration of 0.5 to 1.0 gram per square meter of surface, said tissue transmitting at least 50% of available visible solar light and absorbing at least 90% of light within the range 3500–3700 A°.

20. A transparent, flexible wrapping tissue comprising a substantially non-fibrous transparent cellulosic base and Michler's ketone associated therewith in a concentration of 0.5 to 1.0 gram per square meter of surface, and a surface coating, said tissue transmitting at least 50% of available visible solar light and absorbing at least 90% of light within the range 3500–3700 A°.

21. A wrapping tissue comprising a transparent base and a moistureproof surface coating and embodying a material which is an absorbent for light rays within the range 3200–4000 A°, said tissue absorbing at least 90% of light within the range 3500–3700 A°, and transmitting at least 50% of the visible solar light, said surface coating exhibiting no substantial visible light absorption characteristics.

22. A package comprising a material susceptible to change under the photochemical action of solar light, said material being contained in a transparent wrapping tissue containing a compound which has a substantially complete absorption in the region 3500–3700 A°, said tissue transmitting at least 50% of available visible solar light and absorbing at least 90% of the light within the range 3500–3700 A°.

23. A package comprising a material susceptible to change under the photochemical action of solar light, said material being contained in a transparent wrapping tissue containing Michler's ketone, said tissue transmitting at least 50% of available visible solar light and absorbing at least 90% of the light within the range 3500–37000 A°.

24. A package comprising a material susceptible of rancidity under the influence of solar light, said material being contained in a non-plastic, tasteless, odorless and substantially transparent and colorless wrapping tissue of regenerated cellulose having a thin, moistureproof coating containing about 0.6 gram of Michler's ketone per square meter of surface, said tissue transmitting at least 50% of available visible solar light and absorbing at least 90% of the light within the range 3500–3700 A°.

25. A film suitable for use as a wrapping tissue having a material associated therewith which is an absorbent for light rays within the range 3200–4000 A° and a stabilizing agent for said material, said film transmitting at least 50% of available visible solar light and absorbing at least 90% of light within the range 3500–3700 A°.

26. A wrapping tissue comprising a transparent base having a material associated therewith which is an absorbent for light rays within the range 3200–4000 A°, a surface coating on said base, said surface coating having a material associated therewith which is an absorbent for light rays deleterious to said first-named material, said tissue transmitting at least 50% of available visible solar light and absorbing at least 90% of the light within the range 3500–3700 A°.

27. A wrapping tissue comprising a transparent base having a slightly colored material associated therewith which is an absorbent for light rays within the range 3200–4000 A°, and a material having a color complementary to the color of said first-named material, said tissue transmitting at least 50% of available visible solar light and absorbing at least 90% of the light within the range 3500–3700 A°.

28. A film suitable for use as a wrapping tissue having a material associated therewith which is an absorbent for light rays within the range 3200–4000 A°, said film transmitting at least 50% of available visible solar light and absorbing at least 90% of light within the range 3500–3700 A° and having an appreciable selective absorption of visible light.

29. A wrapping tissue comprising a transparent base and a surface coating and embodying a material which is an absorbent for light rays within the range 3200–4000 A°, said tissue absorbing at least 90% of light within the range 3500–3700 A°, and transmitting at least 50% of the visible solar light, said surface coating exhibiting substantial visible light absorption characteristics.

30. A package comprising a material susceptible to change under the photochemical action of solar light, said material being contained in a transparent wrapping tissue containing a compound which has a substantially complete absorption in the region 3500–3700 A°, said tissue transmitting at least 50% of available visible solar light and absorbing at least 90% of light within the range 3500–3700 A°, said material exhibiting substantial visible light absorption characteristics.

31. A package comprising a material susceptible to change under the photochemical action of solar light, said material being contained in a transparent wrapping tissue containing a compound which has a substantially complete absorption in the region 3500–3700 A°, said tissue transmitting at least 50% of available visible solar light and absorbing at least 90% of light within the range 3500–3700 A°, said material exhibiting substantial visible light absorption characteristics in the lower part of the visible spectrum.

ARCHIBALD STUART HUNTER.

CERTIFICATE OF CORRECTION.

Patent No. 2,062,179.

November 24, 1936

ARCHIBALD STUART HUNTER.

It is hereby certified that error appears in the printed specification of the above numbered patent requiring correction as follows: Page 4, second column, line 3, in the formula, insert the letter O above the double bond first occurrence; page 11, second column, line 43, claim 23, for "37000" read 3700; and that the said Letters Patent should be read with these corrections therein that the same may conform to the record of the case in the Patent Office.

Signed and sealed this 16th day of February, A. D. 1937.

Seal)

Henry Van Arsdale
Acting Commissioner of Patents.

CERTIFICATE OF CORRECTION.

Patent No. 2,062,179.

November 24, 1936.

ARCHIBALD STUART HUNTER.

It is hereby certified that error appears in the printed specification of the above numbered patent requiring correction as follows: Page 2, second column, line 61, strike out the comma and words ", cellulose glycollic acid" and insert instead the words or esterified cellulose; and that the said Letters Patent should be read with this correction therein that the same may conform to the record of the case in the Patent Office.

Signed and sealed this 29th day of June, A. D. 1937.

Seal)

Henry Van Arsdale
Acting Commissioner of Patents.

CERTIFICATE OF CORRECTION.

Patent No. 2,062,179. November 24, 1936.

ARCHIBALD STUART HUNTER.

It is hereby certified that error appears in the printed specification of the above numbered patent requiring correction as follows: Page 4, second column, line 3, in the formula, insert the letter O above the double bond first occurrence; page 11, second column, line 43, claim 23, for "37000" read 3700; and that the said Letters Patent should be read with these corrections therein that the same may conform to the record of the case in the Patent Office.

Signed and sealed this 16th day of February, A. D. 1937.

(Seal)

Henry Van Arsdale
Acting Commissioner of Patents.

Patent No. 2,062,179. November 24, 1936.

ARCHIBALD STUART HUNTER.

It is hereby certified that error appears in the printed specification of the above numbered patent requiring correction as follows: Page 2, second column, line 61, strike out the comma and words ", cellulose glycollic acid" and insert instead the words or esterified cellulose; and that the said Letters Patent should be read with this correction therein that the same may conform to the record of the case in the Patent Office.

Signed and sealed this 29th day of June, A. D. 1937.

(Seal)

Henry Van Arsdale
Acting Commissioner of Patents.